Aug. 25, 1936.　　G. C. WALBERG　　2,052,262
FISHING FLOAT
Filed May 8, 1935
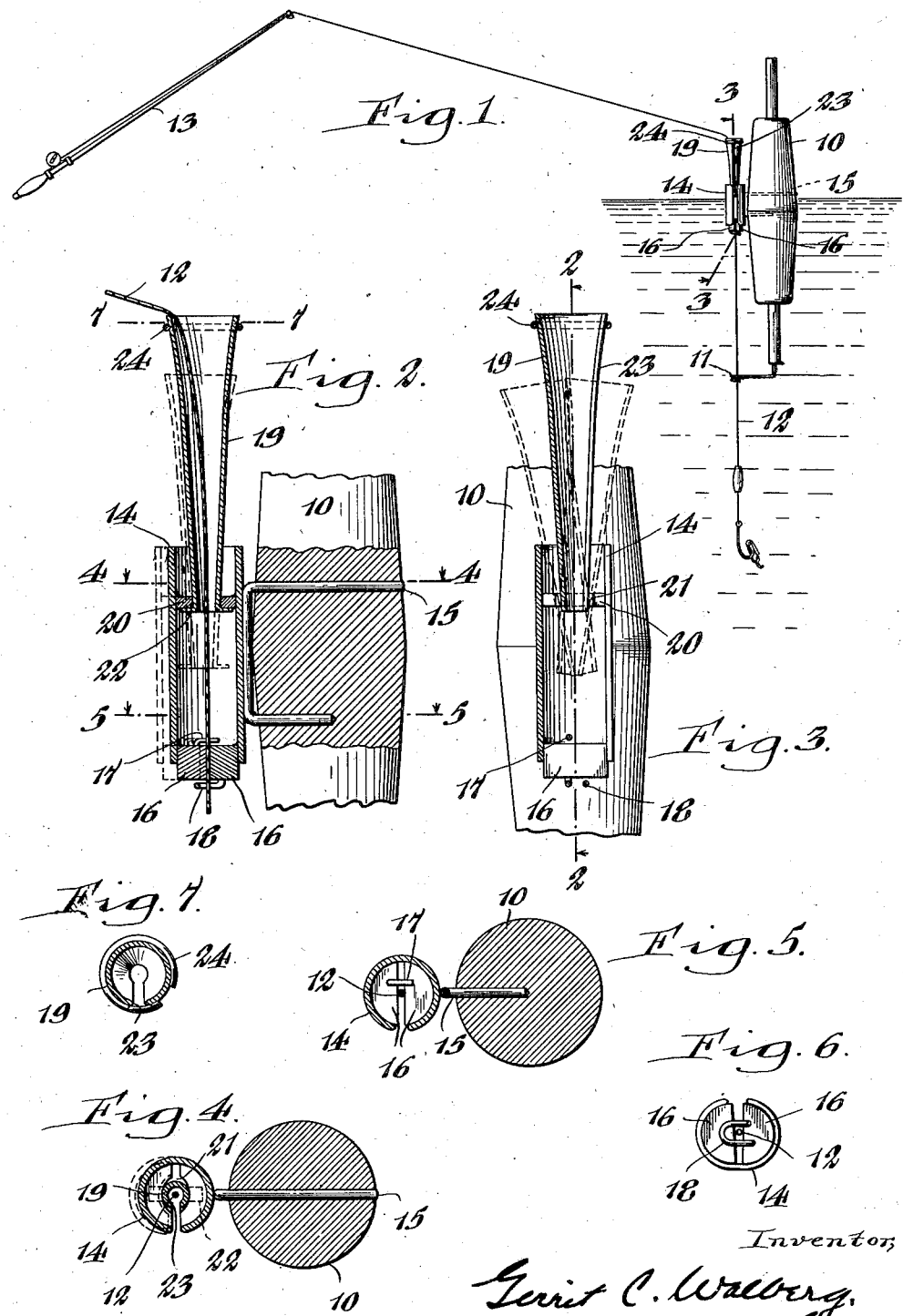

Patented Aug. 25, 1936

2,052,262

UNITED STATES PATENT OFFICE 2,052,262

FISHING FLOAT

Gerrit C. Walberg, Buffalo, N. Y.

Application May 8, 1935, Serial No. 20,435

8 Claims. (Cl. 43—49)

This invention relates to certain new and useful improvements in fishing floats or bobs.

It has for its primary object to provide a simple and efficient float of this character having effective means for controlling the line in various depths of water while casting.

Another object of the invention is the provision of a fishing float or bob having a line-control element thereon which is so designed and constructed as to effect the automatic anchorage of the line, at the desired depth, from a point remote from the float, as at the pole end of the line.

A further object is to provide a releasable line-control element for fishing floats which, while functioning to hold the line at any desired fishing depth, may be readily released at a predetermined time to enable a caught fish to be pulled directly to the end of the pole.

Other features of the invention reside in the construction and arrangement of parts hereinafter described and particularly pointed out in the appended claims.

In the accompanying drawing:—

Figure 1 is a side elevation of a fishing float embodying my invention. Figure 2 is a transverse vertical section taken on line 2—2, Figure 3. Figure 3 is an enlarged vertical section taken in the plane of line 3—3, Figure 1. Figures 4 and 5 are cross sections taken on the correspondingly numbered lines in Figure 2. Figure 6 is a bottom end view of the line-engaging tube and jaws. Figure 7 is a cross section taken on line 7—7, Figure 2.

Similar characters of reference indicate corresponding parts throughout the several views.

This improved fishing tackle or float is particularly adapted for use in casting, although it may also be used effectively in shore fishing from a bank, pier, boat or the like where it is desirable to determine the depth of the water and then accordingly regulate the desired depth for floating the bait after making the cast or throwing the line into the water. The structure is such that after casting the float and line into the water, the line is free to descend relatively to the float and is thereafter clamped to the float at the depth desired, such clamping action being governed by a control means adapted to be actuated remotely from the float, as from the casting position of the fisherman, by a particular to and fro or jerking of the line. Such control means is also adapted to be actuated during pulling in of the line by its contacting the pole, whereby the line is released from its clamped position and free to be drawn in relatively to the float to bring the fish directly into the boat and as near to the fisherman as possible and thereby facilitate the removal of the fish from the hook.

Referring now to the drawing, 10 indicates the bob or float which may be made of wood or other appropriate buoyant material and which is provided at its lower end with a suitable guide 11 for the fish line 12. The line has been shown as connected to a fish pole 13.

Applied to the float and preferably at one side thereof is a longitudinally-split line-engaging tube or sleeve 14 of metal or like material to render the tube resilient to expand and contract within certain limits, said tube being substantially axially in line with the guide-eye 11 and having a coupling means 15 attached thereto for readily connecting it to and disconnecting it from the float. The fish line extends through this split tube and the latter is provided at its lower end with jaws 16 which meet at their opposing edges diametrically across the split portion of the tube and are suitably anchored thereto as seen in Figures 2 and 6. In the contracted position of the tube, shown by full lines in Figure 2, these jaws clamp the line rigidly in any desired position depending upon the depth of water while casting. Upon expanding the tube or sleeve to the dotted line position in said figure, the jaws are released to free the line and permit its movement relative to the float. To prevent the line being laterally displaced from the split tube 14, I provide the top and bottom faces of the jaws 16 with guide members 17 and 18, respectively, these members being fixed at one end to one of the jaws and bridging the gap between the jaws.

The split tube 14 is normally held contracted to grip the line 12 by its own resilience, and in order to effect its expansion to release the line to allow it to drop to the particular depth of the water in which one is fishing, I provide a control element which is so designed and constructed as to be actuated by the user at a point remote from the float 10, so that upon casting the line into the water the user may thereafter control from the pole end of the line the contraction of the split tube to grip the line and hold it at the desired depth for fishing. To this end, this control element preferably consists of a wedge-like member or spreader in the form of a tapered tube 19 fitted in the split tube 14 to move axially thereof to govern the expansion and contraction of the split tube in response to a downward and upward movement of the tapered tube to release or grip the line 12. Adjacent its upper end the split tube has a split guide collar 20 containing an axially-disposed bearing opening 21 through which the tapered tube extends and which opening is preferably substantially oval or elongated in the direction of the split in the collar, as seen in Figure 4. At its lower end the tapered tube 19 has a stop flange 22 which is adapted to abut against the bottom side of the collar 20 to limit its upward movement and at the same time afford a retaining connection between it and the split tube 14. As seen in Figures 2 and 3, the tapered tube extends at its upper end a suitable distance above the split tube 14 to enable a lateral fore and aft tilting or rocking movement to be transmitted thereto from the pole-end of the line, such movement being depicted by dotted lines in Figure 3, and whereby in response to such crosswise tilting of the tapered tube, it is gradually loosened or freed and forced upwardly to allow the split tube 14 to contract and grip the line at the desired depth for fishing. The pressure resulting from the tendency of the tube 14 to contract tends to effect the upward creeping of the tapered tube 19 to gradually dislodge it from contact with its bearing opening 21 and simultaneously contract the jaw-bearing tube to its line-clamping position.

To facilitate the initial threading of the line through the tapered tube 19, I preferably split the same as indicated at 23, the upper end of the tube having a guard ring 24 which bridges the upper portion of the split in the tube.

In using my improved float, to readily adjust the line to bring the bait at the depth desired, the tapered tube 19 is forced downwardly into the split tube 14 to spread it to the dotted line position depicted in Figure 2. The float together with the line is then cast into the water and the line allowed to reel out until the sinker strikes bottom, after which the fisherman pulls in the line to bring the bait at the desired floating depth. Thereupon, the pole-end of the line is smartly swung to and fro in a lateral direction to transmit a rocking vibratory movement to the tapered tube and ultimately elevate it to effect the contraction of the split tube to bring its jaws 16 into clamping relation with the line and securely hold it at the desired depth for fishing. When a fish is caught and pulled in, the flared end of the tapered tube 19 encounters the pole and forces it into the split tube 14 to expand it and release the jaws 16 from the line, thereby enabling the line to be drawn in further and bring the fish to a convenient position for removing it from the hook.

I claim as my invention:—

1. A fishing float, comprising a body having a line-engaging member, means for clamping the line at any desired depth, and means for controlling the actuation of said clamping means.

2. A fishing float, comprising a body having a line-engaging member, releasable means for clamping the line at any desired depth, and means adapted to be actuated at a remote distance from the float for controlling said clamping means to clamp the line for floating the bait at the desired depth.

3. A fishing float, comprising a body having a line-engaging tube containing resilient jaws for clamping the line at a desired depth, and shiftable means for holding said jaws in a released position to permit a movement of the line relative to said tube.

4. A fishing float, comprising a body having a line-engaging tube containing resilient jaws for clamping the line at a desired depth, and a second line-engaging tube extending within said first-named tube for governing the opening and closing of said jaws to release and clamp the line, respectively.

5. A fishing float, comprising a body having an expansible line-engaging member having jaws at one end for clamping the line at a desired depth, said member tending normally to contract and close its jaws, and an axially-disposed, wedge-like, line-guiding member for controlling the opening and closing of said jaws.

6. A fishing float, comprising a body having a longitudinally-split, line-engaging tube having opposing jaws therein adapted to open and close in the plane of the split in said tube to releasably clamp the line at any depth, and a tapered, line-engaging control tube fitted within said split tube for governing its expansion and contraction to open and close the jaws.

7. A fishing float, comprising a body having a longitudinally-split, line-engaging tube having jaws therein adapted to open and close in response to the expansion and contraction of the tube to releasably clamp the line at any desired depth, a split guide collar in said tube spaced from its jaws, and a tapered line-engaging control tube fitted for axial movement in said split tube and engaging its guide collar for governing the expansion and contraction of said split tube to open and close its jaws.

8. A fishing float, comprising a body having an expansible line-engaging member having jaws at one end for clamping the line at a desired depth, said member tending normally to contract and close its jaws, and a tapered line-guiding tube extending into said expansible member for controlling the opening and closing of said jaws, said member having a bearing element for said tapered tube, the latter being laterally shiftable by the line to effect its release from contact with the bearing element and effect the contraction of said expansible member and the closing of the jaws to clamp the line in a desired depth position.

GERRIT C. WALBERG.